United States Patent
Rich et al.

(10) Patent No.: US 10,826,139 B2
(45) Date of Patent: Nov. 3, 2020

(54) BATTERY ENCLOSURE ALLOWING SELECTIVE AIRFLOW TO AND FROM THE BATTERY ENCLOSURE

(71) Applicant: GM Global Technology Operations LLC, Detroit, MI (US)

(72) Inventors: Dave G. Rich, Sterling Heights, MI (US); Saad Hasan, Detroit, MI (US); Jeffrey Wyka, Clinton Township, MI (US); Jianfeng Wang, Nanjing (CN); Dewen Kong, Shanghai (CN); Haijing Liu, Shanghai (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 57 days.

(21) Appl. No.: 16/013,254

(22) Filed: Jun. 20, 2018

(65) Prior Publication Data

US 2019/0393569 A1    Dec. 26, 2019

(51) Int. Cl.
| | |
|---|---|
| *H01M 10/617* | (2014.01) |
| *H01M 2/10* | (2006.01) |
| *H01M 10/625* | (2014.01) |
| *H01M 10/6562* | (2014.01) |
| *H01M 10/6556* | (2014.01) |
| *H01M 2/18* | (2006.01) |

(Continued)

(52) U.S. Cl.
CPC ......... *H01M 10/617* (2015.04); *B60R 16/033* (2013.01); *H01M 2/1072* (2013.01); *H01M 2/1094* (2013.01); *H01M 2/18* (2013.01); *H01M 10/625* (2015.04); *H01M 10/6556* (2015.04); *H01M 10/6562* (2015.04); *H01M 10/6563* (2015.04); *H01M 10/6572* (2015.04); *H01M 2220/20* (2013.01)

(58) Field of Classification Search
CPC .... H01M 2/1072; H01M 2/1094; H01M 2/18; H01M 10/617; H01M 10/625; H01M 10/6556; H01M 10/6562; H01M 10/6563; H01M 10/6572; B60R 16/033
USPC ........................................ 429/120, 148, 177
See application file for complete search history.

(56) References Cited

U.S. PATENT DOCUMENTS

| | | | | |
|---|---|---|---|---|
| 5,460,900 | A | * 10/1995 | Rao | ..................... H01M 2/0242 |
| | | | | 429/120 |
| 2005/0238954 | A1* | 10/2005 | Kawada | ................ H01M 2/024 |
| | | | | 429/176 |

(Continued)

FOREIGN PATENT DOCUMENTS

JP        2013093151  A  *  5/2013

*Primary Examiner* — Sean P Cullen

(57) ABSTRACT

A battery enclosure shaped and sized to accept and surround a battery includes an outer case defining an aperture and having a base forming a bottom of the battery enclosure, the case having a first wall connected to a second wall, the second wall connected to a third wall, and a fourth wall portion connected to the first and third walls, each of the first, second, third, and fourth walls extending orthogonally from the base. The battery enclosure including a separable outer lid shaped to fit around the aperture of the case. The outer case and the outer lid having a material having thermal conductivity of less than about 0.3 W/mK, the battery enclosure has an air inlet selectively providing airflow to the battery enclosure and an air outlet selectively providing airflow from the battery enclosure, the outer case has a first thickness, the outer lid portion has a second thickness.

19 Claims, 8 Drawing Sheets

(51) Int. Cl.
    *H01M 10/6563*    (2014.01)
    *B60R 16/033*     (2006.01)
    *H01M 10/6572*    (2014.01)

(56) References Cited

U.S. PATENT DOCUMENTS

| | | | |
|---|---|---|---|
| 2006/0115714 A1* | 6/2006 | Lee | H01M 10/63 |
| | | | 429/62 |
| 2009/0191451 A1* | 7/2009 | Sato | H01M 2/1072 |
| | | | 429/120 |
| 2011/0256432 A1 | 10/2011 | TenHouten et al. | |
| 2013/0149574 A1* | 6/2013 | Fries | F28F 13/12 |
| | | | 429/71 |
| 2014/0079959 A1* | 3/2014 | Nicoson | H01M 2/1077 |
| | | | 429/7 |
| 2015/0188203 A1* | 7/2015 | Enomoto | H01M 10/6568 |
| | | | 429/83 |
| 2016/0072105 A1* | 3/2016 | Muto | B60R 16/04 |
| | | | 429/175 |

\* cited by examiner

BATTERY ENCLOSURE ALLOWING SELECTIVE AIRFLOW TO AND FROM THE BATTERY ENCLOSURE

INTRODUCTION

The statements in this section merely provide background information relating to the present disclosure, and may not constitute prior art.

The present disclosure relates to battery enclosures or boxes for housing batteries, and more specifically, to battery enclosures or boxes for housing batteries in automotive applications. Motor vehicle fuel efficiency and emissions targets drive a significant percentage of powertrain design parameters and the like. As a result, motor vehicles are increasingly being designed with smaller internal combustion engines, more electrification, and the like. To provide the necessary amount of electrical energy for the increased electrification of motor vehicles, including for stop-start-equipped motor vehicles, mild-hybrid and hybrid motor vehicles, battery technology has continued to advance. Battery technology improvements often include a shift from lead-acid or nickel metal hydride batteries towards lithium ion, lithium polymer, or similar lithium-based batteries. Lithium-based batteries offer advantages in terms of energy density, energy storage capacity, weight, cost, and the like. However, lithium-based batteries can be sensitive to temperature, and to fluctuations in temperature in particular. Temperature and fluctuations in temperature can reduce lithium-based battery lifespan, and storage capacity. Additionally, lithium-based batteries tend to have a higher initial parts cost than traditional lead acid or nickel metal hydride batteries.

Thus, while current batteries and battery enclosures achieve their intended purpose, there is a need for a new and improved battery enclosure that improves battery thermal stability, promotes battery safety and longevity, and decreases the overall cost of using lithium-based batteries and battery packs within motor vehicle applications and elsewhere.

SUMMARY

According to several aspects, a battery enclosure shaped and sized to accept and surround a battery within a motor vehicle includes an outer case portion defining an aperture and having a base portion forming a bottom of the battery enclosure, the case portion defined by a first wall portion connected to a second wall portion, a second wall portion connected to a third wall portion, and a fourth wall portion connected to the first wall portion and the third wall portion, each of the first wall portion, second wall portion, third wall portion, and fourth wall portion extending substantially orthogonally from the base portion. The battery enclosure including a separable outer lid portion shaped to fit around the aperture of the case portion. The outer case portion and the outer lid portion comprise a material having thermal conductivity of less than about 0.3 W/mK, the battery enclosure has an air inlet selectively providing airflow to the battery enclosure and an air outlet selectively providing airflow from the battery enclosure, the outer case portion has a first thickness, the outer lid portion has a second thickness.

In another aspect of the present disclosure the first thickness is variable, and the second thickness is variable.

In another aspect of the present disclosure the air outlet comprises an opening between the outer lid portion and the outer case portion.

In another aspect of the present disclosure the air inlet has a diameter of between about 0.1 mm and about 20 cm, and the air inlet is disposed in a lower portion of the battery enclosure, and the air outlet is disposed in an upper portion of the battery enclosure.

In another aspect of the present disclosure the battery enclosure has a multi-layer architecture having an inner case portion sized and shaped to fit substantially concentrically within and spaced apart from the outer case portion, and an inner lid portion sized and shaped to fit substantially concentrically within the and spaced apart from the outer lid portion. A volume of air is disposed between the inner case portion and the outer case portion, and between the inner lid portion and the outer lid portion, and each of the inner case portion and the inner lid portion is made of a material with thermal conductivity less than about 0.3 W/mK.

In another aspect of the present disclosure the inner lid portion and outer lid portion are made of a material with a thermal conductivity less than about 0.1 W/mK.

In another aspect of the present disclosure the air inlet and the air outlet are coaxial and formed through the inner case portion and the outer case portion.

In another aspect of the present disclosure the battery enclosure further includes a thermoelectric pad or a cooling coil, the thermoelectric pad or cooling coil disposed on a surface of the inner case portion and the inner lid portion, or disposed on an interior aspect of the outer case portion and the outer lid portion, or disposed between the inner case portion and the inner lid portion, and the outer case portion and the outer lid portion, the thermoelectric pad or cooling coil selectively thermoregulating a temperature of the battery within the battery enclosure.

In another aspect of the present disclosure a configurable vent selectively provides airflow to the battery enclosure.

In another aspect of the present disclosure a layer of aerogel material having a thickness of about 0.01 mm and about 3 cm is disposed on an internal or external aspect of the inner case portion and the inner lid portion, or on an internal aspect of the outer case portion and the outer lid portion.

In another aspect of the present disclosure the aerogel material comprises: silica, carbon, metal oxides, and organic polymers.

In another aspect of the present disclosure battery enclosure further includes a plurality of spacer pads disposed between the inner case portion and the outer case portion, the spacer pads generating a directed airflow pattern between the inner case portion and the outer case portion.

In another aspect of the present disclosure each of the plurality of spacer pads has a thickness of between about 0.01 mm and about 2 cm, and each of the spacer pads comprises: a metal, a plastic, or a resin.

In another aspect of the present disclosure the spacer pads are integrally formed with the outer case portion or the inner case portion.

In another aspect of the present disclosure the battery enclosure further includes an inlet hose, the inlet hose directing air from an air intake disposed on an exterior surface of the motor vehicle into the battery enclosure via the air inlet.

In another aspect of the present disclosure a fan or a baffle selectively directs air through the inlet hose into the battery enclosure, wherein the baffle is mechanically, chemically, or thermally actuated.

In another aspect of the present disclosure the fan is selectively reversible to direct air from the battery enclosure through the inlet hose.

In another aspect of the present disclosure the baffle includes a thermally sensitive material, a heating pad, or a cooling coil, the baffle disposed over the air inlet and having a plurality of perforations, the baffle selectively heating or cooling air entering the battery enclosure.

In another aspect of the present disclosure a multi-layer battery enclosure for a battery of a motor vehicle includes an outer case portion defining an aperture and having a base portion forming a bottom of the battery enclosure, the case portion defined by a first wall portion connected to a second wall portion, a second wall portion connected to a third wall portion, and a fourth wall portion connected to the first wall portion and the third wall portion, each of the first wall portion, second wall portion, third wall portion, and fourth wall portion extending substantially orthogonally from the base portion. The multi-layer battery enclosure further including an inner case portion sized and shaped to fit substantially concentrically within and spaced apart from the outer case portion, an air inlet forming an opening through the outer case portion and the inner case portion, a separable outer lid portion shaped to fit around the aperture of the case portion, and an inner lid portion sized and shaped to fit substantially concentrically within the outer lid portion, the inner lid portion being shaped to provide for a volume of air to be disposed between the inner lid portion and the outer lid portion. The multi-layer battery enclosure further including a plurality of spacer pads integrally formed in at least one of the outer case portion and the inner case portion, the plurality of spacer pads spacing apart the inner case portion and the outer case portion, and generating a directed tunable airflow pattern between the inner case portion and the outer case portion, the spacer pads providing for a volume of air to be disposed between the inner case portion and the outer case portion. Each of the outer case portion, the outer lid portion, the inner case portion, and the inner lid portion being made of a material having thermal conductivity below about 0.3 W/mK, and each of the outer case portion, the outer lid portion, the inner case portion, and the inner lid portion have a thickness between about 0.1 mm to about 5 cm, the air inlet having a diameter of between about 0.1 mm and about 20 cm and disposed in a lower portion of the battery enclosure, and an air outlet forming an opening between the outer lid portion and the outer case portion, the battery enclosure shaped and sized to accept and surround both the battery and a pre fuse disposed on the battery, an inlet hose is connected to the air inlet, the inlet hose directing air from an air intake disposed on an exterior of the motor vehicle into the battery enclosure, and a fan or a mechanically, chemically, or thermally activated baffle selectively allows air from the inlet hose into the battery enclosure.

In another aspect of the present disclosure a multi-layer battery enclosure for a battery of a motor vehicle includes an outer case portion defining an aperture and having a base portion forming a bottom of the battery enclosure, the case portion defined by a first wall portion connected to a second wall portion, a second wall portion connected to a third wall portion, and a fourth wall portion connected to the first wall portion and the third wall portion, each of the first wall portion, second wall portion, third wall portion, and fourth wall portion extending substantially orthogonally from the base portion. The multi-layer battery enclosure further includes an inner case portion sized and shaped to fit substantially concentrically within and spaced apart from the outer case portion, an air inlet forming an opening through the outer case portion and the inner case portion, a separable outer lid portion shaped to fit around the aperture of the case portion, and an inner lid portion sized and shaped to fit substantially concentrically within the outer lid portion, the inner lid portion being shaped to provide for a volume of air to be disposed between the inner lid portion and the outer lid portion. The multi-layer battery enclosure further including a plurality of spacer pads integrally formed in at least one of the outer case portion and the inner case portion, the plurality of spacer pads spacing apart the inner case portion and the outer case portion, and generating a directed airflow pattern between the inner case portion and the outer case portion, the spacer pads providing for a volume of air to be disposed between the inner case portion and the outer case portion. The multi-layer battery enclosure further including a thermoelectric pad or a cooling coil, the thermoelectric pad or cooling coil disposed on a surface of the inner case portion and the inner lid portion, or disposed on an interior aspect of the outer case portion and the outer lid portion, or disposed between the inner case portion and the inner lid portion, and the outer case portion and the outer lid portion, the thermoelectric pad or cooling coil selectively thermo-regulating a temperature of the battery within the battery enclosure. The multi-layer battery enclosure further including a configurable vent, the configurable vent selectively providing airflow to the battery enclosure. Each of the outer case portion, the outer lid portion, the inner case portion, and the inner lid portion being made of a material having thermal conductivity below about 0.1 W/mK, and each of the outer case portion, the outer lid portion, the inner case portion, and the inner lid portion have a thickness between about 0.1 mm to about 5 cm, the air inlet having a diameter of between about 0.1 mm and about 20 cm and disposed in a lower portion of the battery enclosure, and an air outlet forming an opening between the outer lid portion and the outer case portion, the battery enclosure shaped and sized to accept and surround both the battery and a pre fuse disposed on the battery, an inlet hose is connected to the air inlet, the inlet hose directing air from an air intake disposed on an exterior of the motor vehicle into the battery enclosure, and a fan or a mechanically, chemically, or thermally activated baffle selectively allows air from the inlet hose into the battery enclosure.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
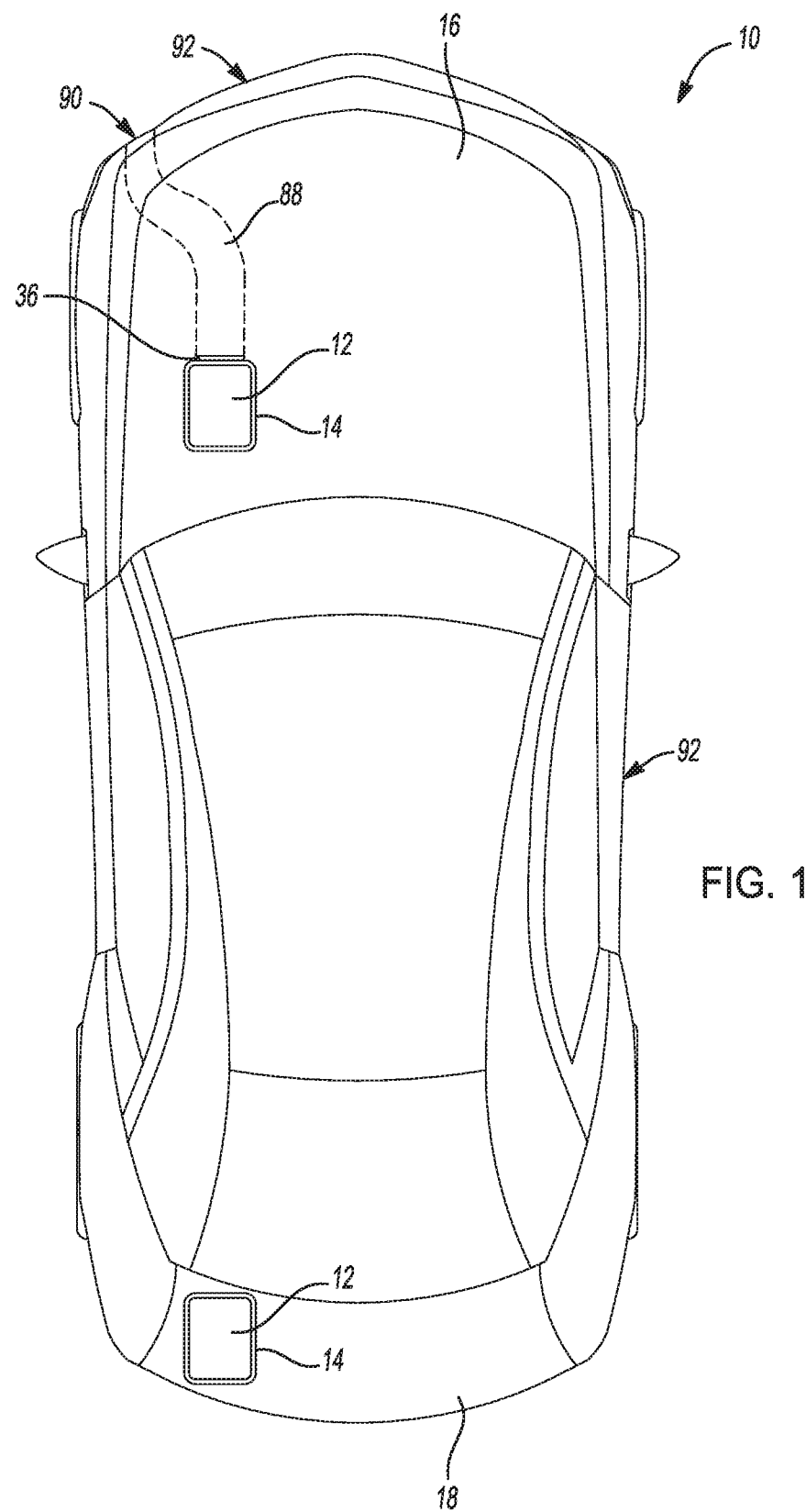
FIG. 1 is an environmental view of a motor vehicle equipped with a thermal enclosure for a battery according to an aspect of the present disclosure.

Referring to FIG. 1, a motor vehicle is shown and indicated generally by reference number 10. While the motor vehicle 10 is depicted as a car, it should be understood that the motor vehicle 10 may be a car, a truck, an SUV, a van, a semi, a tractor, a bus, a go-kart, or any other such motor vehicle 10 without departing from the scope or intent of the present disclosure. The motor vehicle 10 is equipped with a battery 12 disposed within a thermal enclosure or thermal box 14. In several aspects, the battery 12 is a Lithium-ion battery (LIB), or a Lithium-polymer battery (LIPB). However, it should be understood that the battery 12 may be any other type of battery 12, including but not limited to lead-acid batteries (LAB), Nickel-Metal Hydride (NiMH), Nickel-Cadmium (NiCd), or other such batteries without departing form the scope or intent of the present disclosure. Batteries 12, and in particular high energy density batteries 12, such as LIBs, LIPBs, and NiMHs can be sensitive to temperature, and/or temperature fluctuations. As LIBs, LIPBs, and NiMHs are subjected to high temperatures or temperature fluctuations, the storage capacity, longevity and performance of such batteries 12 can be diminished. Thus, by thermally isolating the battery 12 from the battery's surroundings via a thermal enclosure 14, the storage capacity, longevity, and performance of the batteries 12 may be maintained. The thermal enclosure 14 is composed of materials having low thermal conductivity, such as resin, plastic, polypropylene, polyethylene terephthalate (PET), or the like. In several aspects it is desirable for the thermal enclosure 14 to have low thermal conductivity so that the thermal enclosure 14 provides a high degree of thermal isolation for the battery 12 relative to the ambient surroundings of the thermal enclosure 14. In some examples, the thermal enclosure 14 is composed of materials having a thermal conductivity of less than about 0.3 W/mK. In other examples, the thermal enclosure 14 is composed of materials having a thermal conductivity less than about 0.1 W/m K.

The motor vehicle 10 in FIG. 1 is depicted as having two batteries 12 disposed in two separate thermal enclosures 14, one thermal enclosure 14 in an engine compartment 16 of the motor vehicle 10, and a second thermal enclosure 14 in a trunk 18 of the motor vehicle 10. However, it should be understood that the motor vehicle 10 may have any quantity of thermal enclosures 14 for housing batteries 12 within the motor vehicle 10 without departing from the scope or intent of the present disclosure. Moreover, the thermal enclosures 14 may be disposed in a wide variety of locations within the motor vehicle 10, such as the engine compartment 16, the trunk 18, beneath the rear seats (not shown), or other such locations. In some examples, the thermal enclosure 14 encloses not only the battery 12, but a pre-fuse or fuse block 15 mounted either on the battery 12 itself, or on the thermal enclosure 14. In some examples, a plurality of pre-fuses 15 are mounted either to the battery 12 or the thermal enclosure 14, depending on the redundancy and safety requirements of the particular application. The pre-fuse 15 prevents damage to the motor vehicle 10 wiring harness that may occur in high current conducting wires in the event of a short circuit, such as what might occur during a motor vehicle 10 accident. In several aspects, the pre-fuse 15 functions substantially like a battery 12 disconnect.

Figure 2:
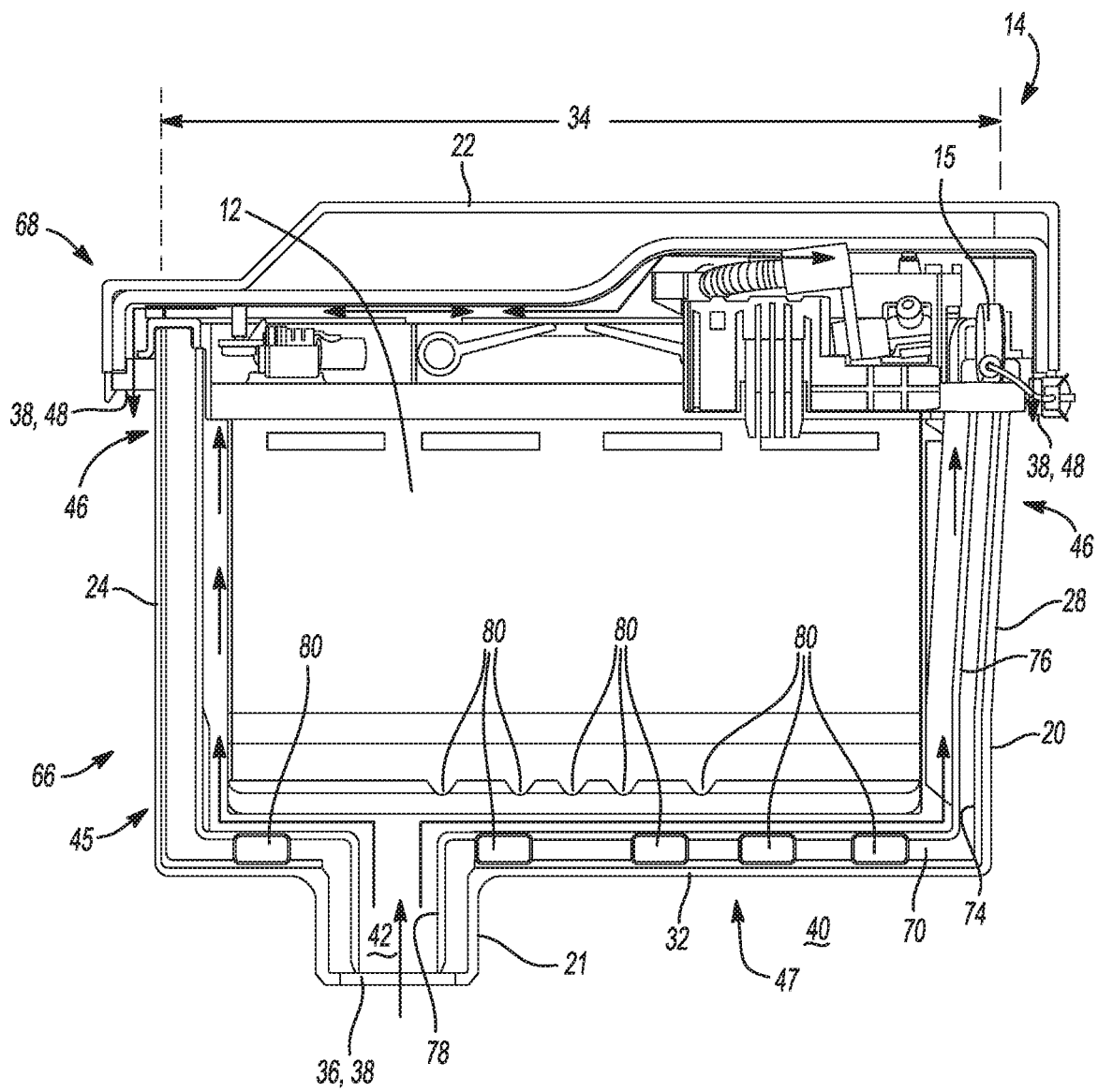
FIG. 2 is a cross sectional view of a thermal enclosure according to an aspect of the present disclosure.
Figure 3:
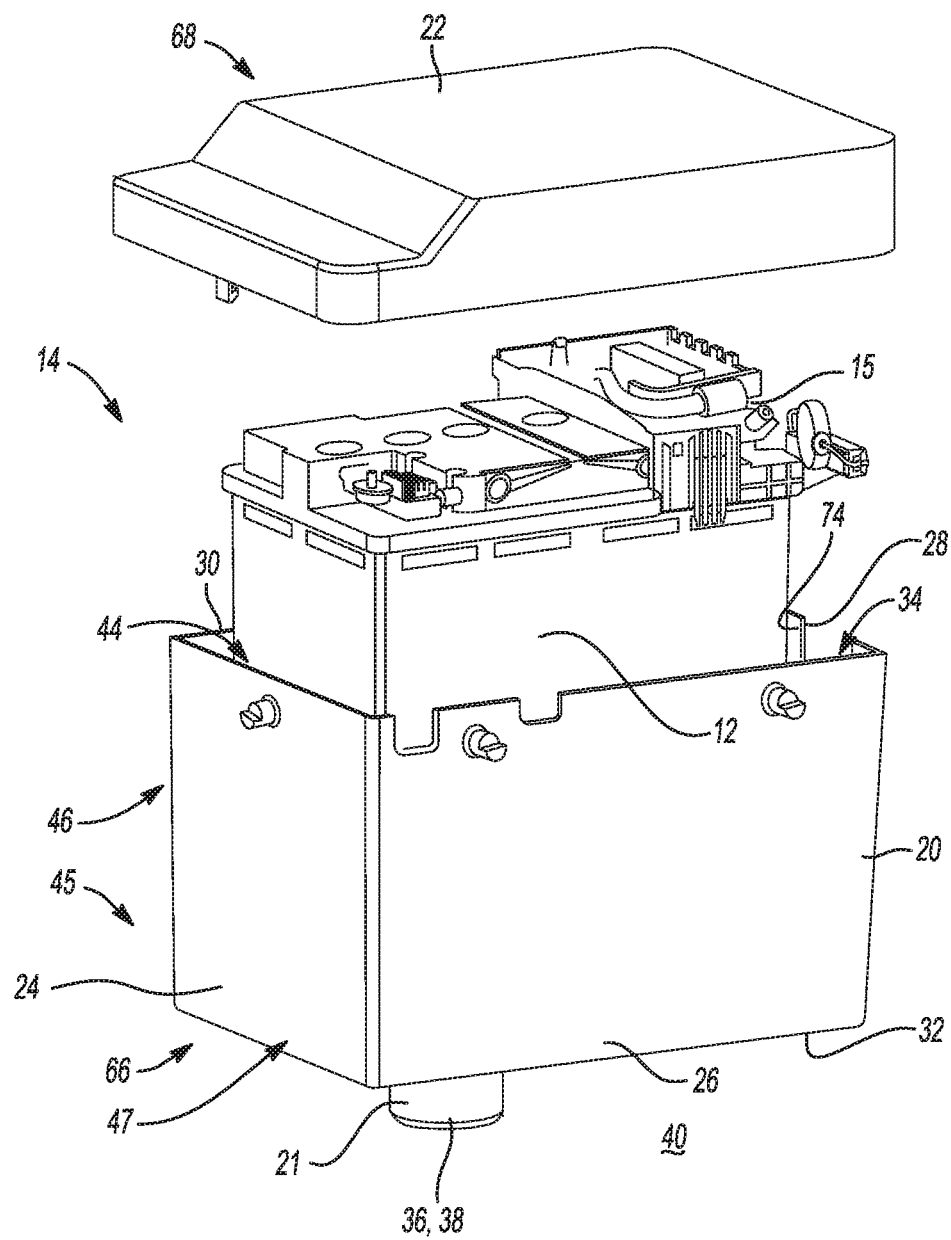
FIG. 3 is an exploded perspective view of a thermal enclosure according to an aspect of the present disclosure.

Turning now to FIGS. 2 and 3, and with continuing reference to FIG. 1, the thermal enclosure 14 of the present disclosure is shown in more detail. The thermal enclosure 14 has an outer case portion 20 and an outer lid portion 22. The outer case portion 20 has a first wall portion 24 connected to a second wall portion 26. The second wall portion 26 is connected to a third wall portion 28, and the third wall portion 28 is connected to a fourth wall portion 30. The fourth wall portion 30 is also connected to the first wall portion 24. Each of the first wall portion 24, second wall portion 26, third wall portion 28, and fourth wall portion 30 is connected to and extends substantially orthogonally from a base portion 32. The base portion 32 forms a bottom of the thermal enclosure 14. The outer case portion 20 defines an aperture 34. The aperture 34 is disposed opposite the base portion 32 and is sized and shaped to allow the thermal enclosure 14 to accept the battery 12. While the first, second, third, and fourth wall portions 24, 26, 28, 30 are described as extending substantially orthogonally from the base portion 32, it should be understood that depending on the vehicular application, on the type and physical dimensions of a given battery 12, and so forth, the first, second, third, and fourth wall portions 24, 26, 28, 30 may extend from the base portion 32 at other angles entirely. Moreover, it should be understood that because the thermal enclosure 14 is sized and shaped to accept the battery 12, the size and shape of the thermal enclosure 14 varies not only with the vehicular application, but the battery 12 as well. In some examples, the thermal enclosure 14 may have greater than or fewer than four wall portions 24, 26, 28, 30. Moreover, while the thermal enclosure 14 is shown in a vertically-oriented form such that the battery 12 is inserted into the thermal enclosure 14 through an upward-facing aperture 34, the thermal enclosure 14 may be oriented in other directions. For example, the thermal enclosure 14 may be substantially inverted from what is shown in the figures such that the outer lid portion 22 forms a platform onto which the battery 12 is placed, and the outer case portion 20 forms a cloche-like cover. That is, in the above example the outer case portion 20 is placed over the battery 12 and down onto the outer lid portion 22. In a second example, the outer case portion 20 may be oriented such that the aperture 34 forms a sideways-facing opening in the outer case portion 20 rather than an upward or downward-facing opening in the outer case portion 20. In the second example, the battery 12 is placed into the thermal enclosure 14 from a side of the thermal enclosure 14, and the outer lid portion 22 is oriented vertically, rather than horizontally, as is the case in the examples shown in the figures, and in an example where the outer case portion 20 forms the cloche-like cover for the battery 12.

The outer lid portion 22 is sized and shaped to fit over or around the aperture 34 of the outer case portion 20. In some examples, the outer lid portion 22 fits concentrically around the aperture 34 of the outer case portion 20 and is supported by the first, second, third, and fourth wall portions 24, 26, 28, 30. In other examples, the outer lid portion 22 extends into the aperture 34 and is supported by the first, second, third, and fourth wall portions 24, 26, 28, 30. In still further examples, the outer lid portion 22 is shaped to extend into the aperture 34 and to fit concentrically around the first, second, third, and fourth wall portions 24, 26, 28, 30. The outer lid portion 22 is separable from the outer case portion 20, thereby providing access to the battery 12.

The thermal enclosure 14 has an air inlet 36 in fluid communication with an air outlet 38, and both the air inlet 36 and air outlet 38 are in fluid communication with ambient air 40. The air inlet 36 is shaped and sized to provide a flow of cooling air 42 to an interior 44 of the thermal enclosure 14. The precise size and shape of the air inlet 36 may vary substantially from application to application, depending on thermal requirements, packaging, etc. of the application. In some aspects the air inlet 36 is formed through the outer case portion 20. More specifically, the air inlet 36 is formed through a lower or bottom portion 45 of the outer case portion 20. In one example, the air inlet 36 is formed through the base portion 32 of the outer case portion 20 and defines a coupling 21 extending from an exterior surface 47 of the outer case portion 20. In some aspects the air inlet 36 has a width or diameter of between about 0.1 mm and about 20 cm. In other aspects, the air inlet 36 and/or air outlet 38 are formed as an opening or gap between at least two of the wall portions 24, 26, 28, 30 and/or the base portion 32. That is, in some examples the air inlet 36 is formed as an opening or gap between the first and second wall portions 24, 26, and/or between the second and third wall portions 26, 28, and/or between the third and fourth wall portions 28, 30, and/or between the first and fourth wall portions 24, 30, and/or between any of the first, second, third, and fourth wall portions 24, 26, 28, 30, and the base portion 32.

Like the air inlet 36, the air outlet 38 is shaped and sized to extract the cooling air 42 from the interior 44 of the thermal enclosure 14. In some examples, the air outlet 38 is formed at an upper or top portion 46 of the thermal enclosure 14. However, the precise size, shape, and location of the air outlet 38 can vary substantially from application to application, depending on the thermal requirements, packaging, etc., of the application. In one example, the air outlet 38 is formed as an opening or gap 48 between the outer case portion 20 and the outer lid portion 22, proximate the aperture 34.

Figure 4:
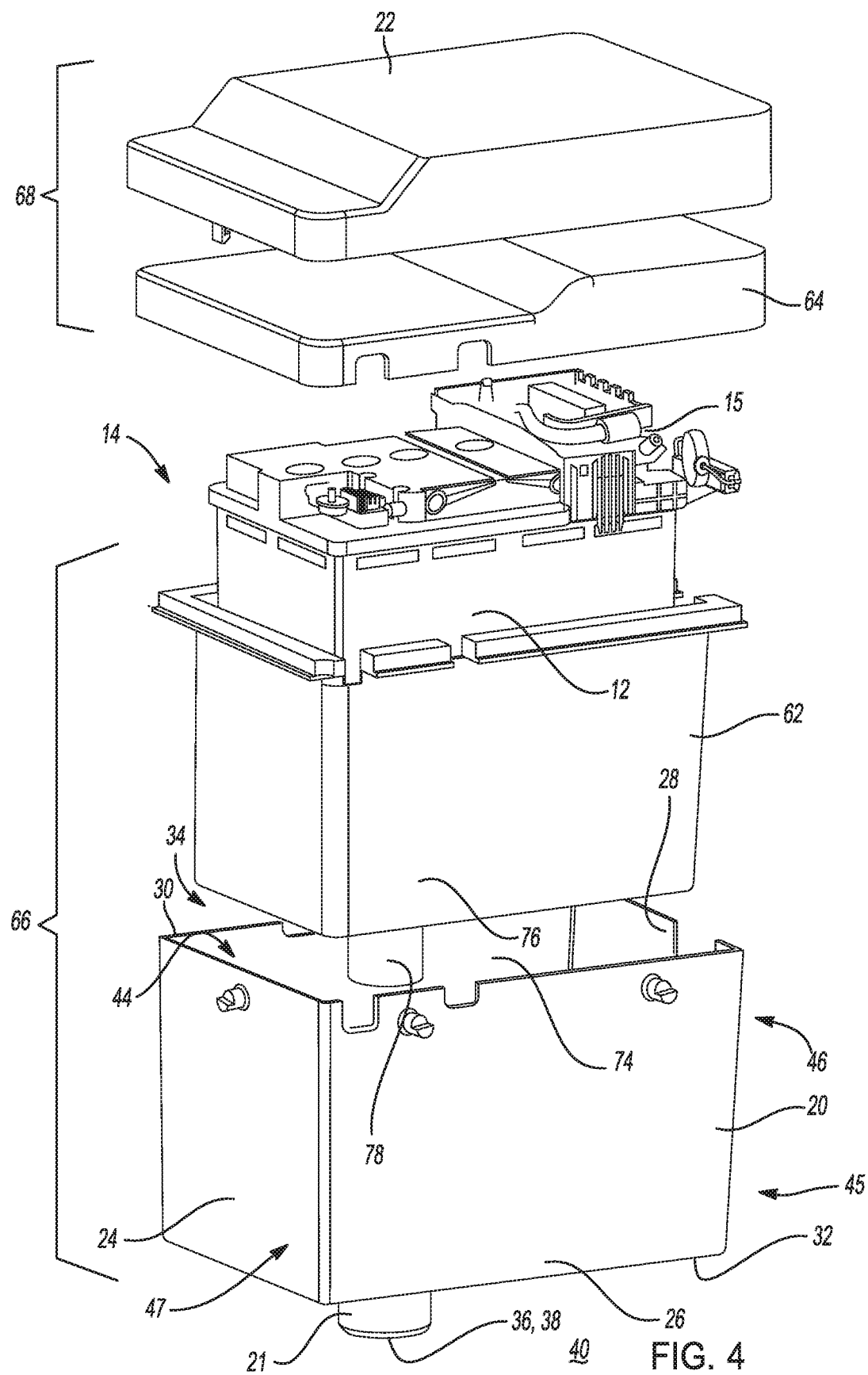
FIG. 4 is an exploded perspective view of a multi-layer thermal enclosure according to an aspect of the present disclosure.
Figure 5:
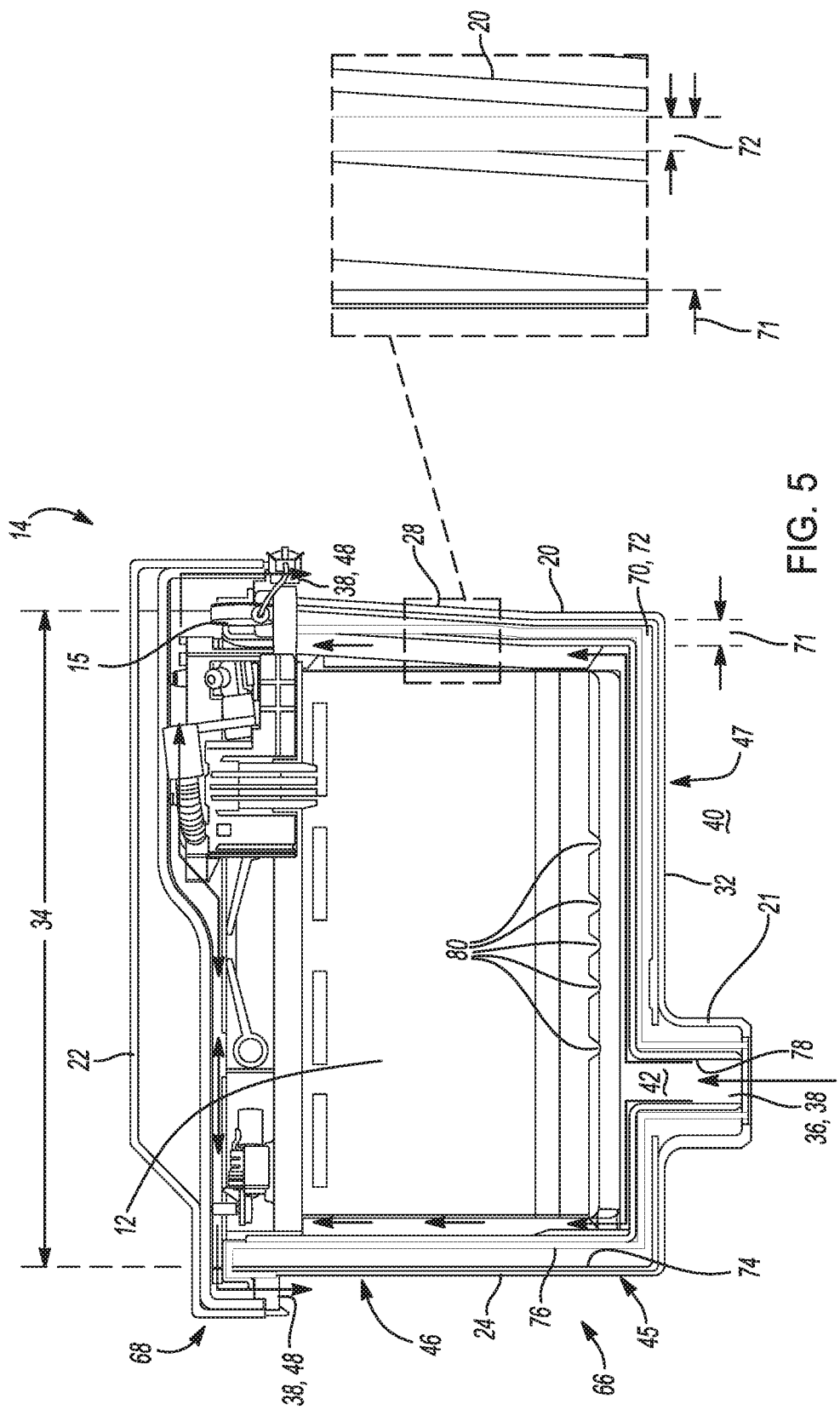
FIG. 5 is a cross sectional view of a thermal enclosure having a volume of insulating material according to an aspect of the present disclosure.

Turning now to FIGS. 4 and 5, and with continuing reference to FIGS. 1-3, in some examples, the thermal enclosure 14 has a multi-layer construction formed of an inner case portion 62 and an inner lid portion 64. Each of the inner lid and case portions 62, 64 are formed of material having a low thermal conductivity, such as a thermal conductivity below about 0.3 W/mK, or, in some examples, below about 0.1 W/mK. The inner case portion 62 is sized and shaped to fit substantially within the outer case portion 20. More specifically, the inner case portion 62 is sized and shaped to fit concentrically within the outer case portion 20 while also being spaced apart from the outer case portion 20. The inner lid portion 64 is sized and shaped to fit substantially within the outer lid portion 22. Like the inner case portion 62 fits within the outer case portion 20, the inner lid portion 64 is sized and shaped to fit concentrically within the outer lid portion 22 while also being spaced apart from the outer lid portion 22.

The inner case and inner lid portions 62, 64 are separable from one another in much the same way as the outer case and outer lid portions 20, 22. More specifically, the inner case and outer case portions 20, 62 are fitted together and operate as a single case unit 66, and the inner lid and outer lid portions 22, 64 are fitted together and operate as a single lid unit 68. Thus, the lid unit 68 fits substantially concentrically around the case unit 66, while the lid unit 68 is separable from the case unit 66 such that the battery 12 may be placed inside the case unit 66 and covered by the lid unit 68.

Because the inner case portion 62 and inner lid portion 64 are spaced apart from the outer case portion 20 and the outer lid portion 22 respectively, a volume of insulating material 70 is disposed in a void 71 between the inner case and lid portions 62, 64 and the outer case and lid portions 20, 22. In some aspects, the insulating material 70 is a gas, or a gaseous mixture such as air, however, depending on the application, other solid or liquid insulating materials 70 may be used without departing from the scope or intent of the present disclosure.

With particular reference to FIG. 5, and with continuing reference to FIGS. 1-4, the insulating materials 70 are shown in more detail. An aerogel material 72 fills a portion of the void 71. The aerogel material 72 is a synthetic, porous, ultralight material derived from a gel in which a liquid component has been replaced with a gas, resulting in a solid with low density and low thermal conductivity. In some examples, the aerogel material 72 is a tape, a foam, or a plasticized tape made from silica, carbon, metal oxides, organic polymers, etc. In some examples, the aerogel material 72 is formed of at least in part silicon dioxide ($SiO_2$) and aluminum oxide ($Al_2O_3$). The aerogel 72 may be disposed on an interior surface 74 of the outer case and outer lid portions 20, 22, or on an exterior surface 76 of the inner case and inner lid portions 62, 64, or on both. Moreover, the aerogel material 72 may be a single layer, or a plurality of layers of similar or differing thicknesses and/or material composition, and the aerogel material 72 may fill the entirety of the volume of insulating material 70, or only a portion thereof. For example, the aerogel material 72 may have a thickness of between about 0.01 mm and about 3 cm.

As with the examples of FIGS. 2 and 3, the air inlet 36 of the multi-layer thermal enclosure 14 is in fluid communication with the air outlet 38, and both the air inlet 36 and air outlet 38 are in fluid communication with ambient air 40. The air inlet 36 is sized and shaped to provide a flow of cooling air 42 to an interior 44 of the thermal enclosure 14, however, in some examples the air inlet 36 also provides a flow of cooling air 42 to the volume of insulating material 70. The precise size, shape, and location of the air inlet 36 may vary substantially from application to application, depending on thermal requirements, packaging, and the like. In some aspects, the air inlet 36 is formed through the outer case portion 20 and the inner case portion 62.

Like the air outlet 38 of the examples of FIGS. 2 and 3, the air outlet 38 of the multi-layer enclosure is shaped and sized to extract the cooling air 42 from the interior 44 of the thermal enclosure. In some examples, the air outlet 38 is formed at an upper or top portion 46 of the thermal enclosure. However, the precise size, shape, and location of the air outlet 38 may vary from application to application depending on thermal requirements, packaging, and the like. In one example, the air outlet 38 is formed as an opening or gap 48 between the lid unit 68 and the case unit 66, proximate the aperture 34. In another example, the air outlet 38 is formed by a plurality of openings or vents 50 disposed in the thermal enclosure 14. The openings or vents 50 may be disposed in the case unit 66 or in the lid unit 68, or in any combination thereof depending on the application for which the thermal enclosure 14 is intended. In further examples, the air outlet 38 may be disposed within the air inlet 36. In other words, because the multi-layer thermal enclosure 14 has an inner case portion 62 disposed concentrically within the outer case portion 20, one or the other of the air inlet 36 and air outlet 38 may be disposed coaxially within the other. Put another way, the coupling 21 formed by the air inlet 36 of the outer case portion 20 may fit concentrically around and coaxially with a coupling 78 of the inner case portion 62 that forms the air outlet 38 of the inner case portion 62. The air inlet 36 and air outlet 38 may also be reversed such that the coupling 78 of the inner case portion 62 forms the air inlet 36 and the coupling 21 of the outer case portion 20 forms the air outlet 38 without departing from the scope or intent of the present disclosure. Moreover, while in the above description, the multi-layer thermal enclosure 14 has been described as only having an inner case portion 62 and an outer case portion 20, and an inner lid portion 64 and an outer lid portion 22 thereby forming a two-layer structure, it should be understood that the thermal enclosure 14 may have additional layers without departing from the scope or intent of the present disclosure.

Figure 6:
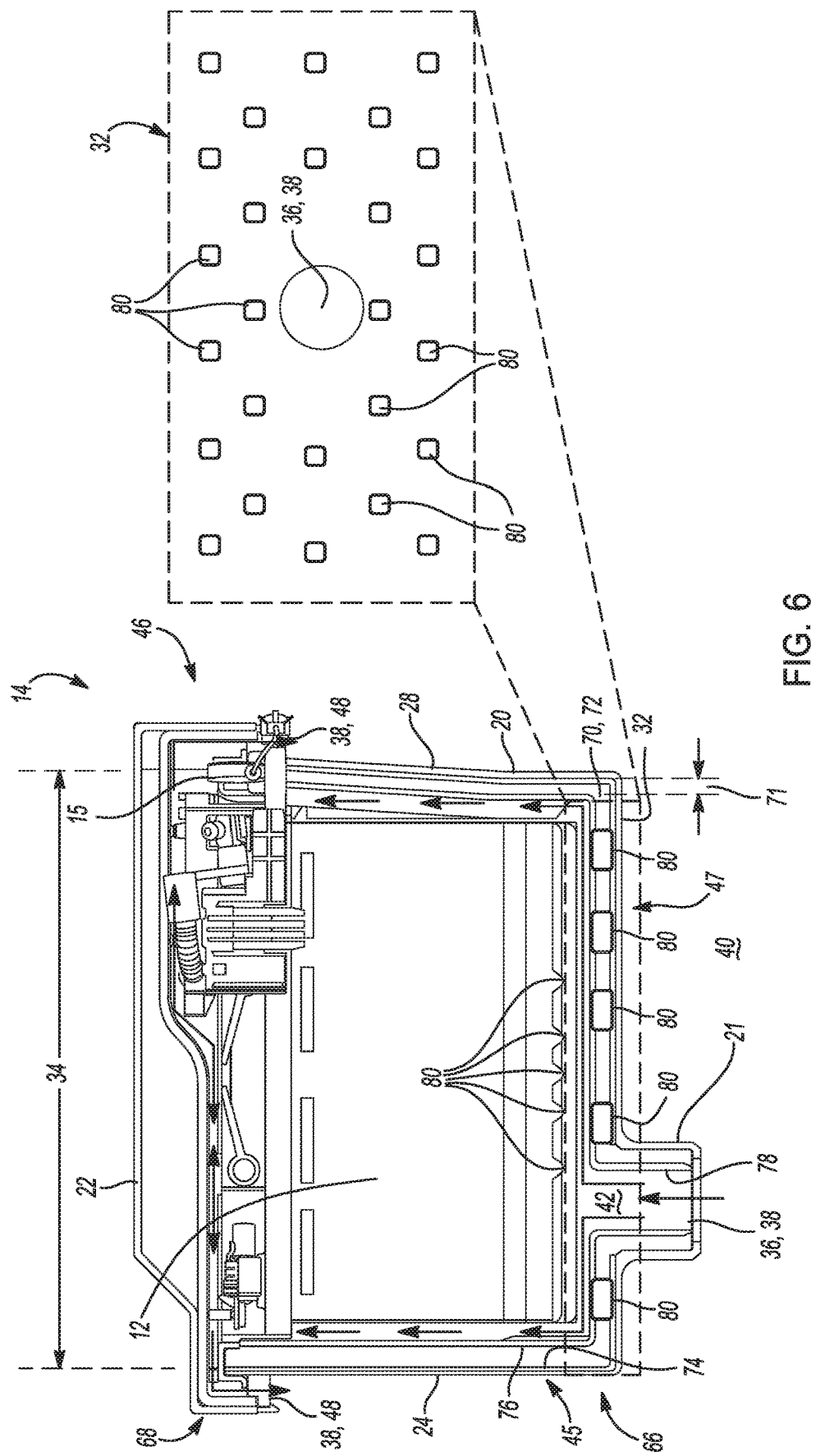
FIG. 6 is a cross sectional view of a thermal enclosure having a plurality of spacer pads according to an aspect of the present disclosure.

Turning now to FIG. 6, and with continuing reference to FIGS. 1-5, in some aspects the thermal enclosure 14 includes a plurality of spacer pads or dimples 80. The spacer pads 80 direct cooling air 42 through the void 71 between the inner case portion 62 and the outer case portion 20. Depending on the application, and on production constraints, etc., the spacer pads 80 may be constructed in a variety of different manners. In one aspect, the spacer pads 80 are integrally formed with at least one of the outer case portion 20, the inner case portion 62, the outer lid portion 22, and the inner lid portion 64. In other examples, the spacer pads 80 are formed of metal, plastic, or resin, and are disposed on the interior surface 74 of the outer case portion 20, or on the exterior surface 76 of the inner case portion 62. In some examples, additional spacer pads 80 are formed in the void 71 between the inner lid portion 64 and the outer lid portion 22. Much like the spacer pads 80 disposed in the void 71 between the inner case portion 62 and the outer case portion 20, the spacer pads 80 are formed or disposed on either the inner lid portion 64, the outer lid portion 22, or both. In some aspects, the spacer pads 80 have a thickness of between about 0.01 mm and about 2 cm. The spacer pads 80 are shaped to generate a directed flow of cooling air 42 based on air pressure differentials, turbulence, and the like. In some aspects, the spacer pads 80 are may be evenly distributed (as shown in FIG. 6), or unevenly distributed about the thermal enclosure 14. The exact pattern and sizing of spacer pads 80 or dimples is variable so as to provide more or less airflow, resistance, or the like, in a given application. In some examples, the spacer pads 80 may have a substantially conical, round, semiflat, triangular or quadrilateral pyramidal shape, or the spacer pads 80 may be interconnected in a racetrack or maze shape to direct the flow of cooling air 42. In one example, the directed flow of cooling air 42 is calculated to thermally manage areas of the battery 12 that are particularly prone to exposure to heat. In another example, the directed flow of cooling air 42 actually provides thermal energy to a portion of the battery 12 calculated to run below optimal battery temperature. In a further example, the battery 12 itself defines air channels (not shown) for cooling air 42 that interact with the thermal enclosure 14, and in some aspects, the spacer pads 80. That is, the battery 12 may in some examples be porous. A porous battery 12 with air channels has increased surface area, and increased cooling capability in comparison with an otherwise similar, but non-porous battery 12. Thus, by including channels in the battery 12, the overall dimensions of the thermal enclosure 14 are reduced, as the cooling needs of the battery 12 are likewise reduced.

Figure 7:
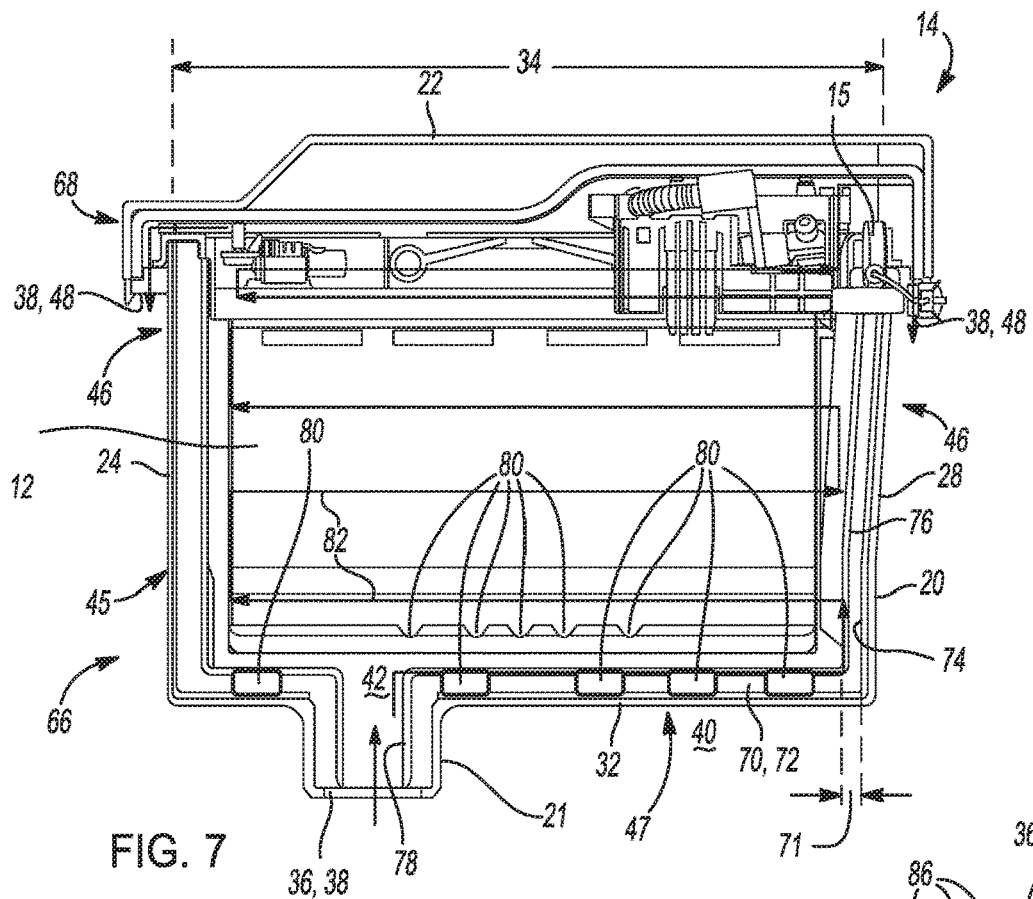
FIG. 7 is a cross sectional view of a thermal enclosure having a thermoelectric cooler or warmer according to an aspect of the present disclosure.

Turning now to FIG. 7, and with continuing reference to FIGS. 1-6, in some examples a thermoelectric cooler/warmer 82 is used with the thermal enclosure 14 and the battery 12 to maintain the battery 12 at an optimal operating temperature. The thermoelectric cooler/warmer 82 is a thermoelectric pad, cooling coil, Peltier device, Kapton heater, conductive heater, or the like. In the example of a Peltier device, energy from the motor vehicle 10 powertrain (not shown) is harvested as a part of engine (not shown) shutdown, and the Peltier device uses the harvested energy to heat or cool the battery 12 within the thermal enclosure 14, as necessary. In one aspect, the thermoelectric cooler/warmer 82 is a thermoelectric pad or a cooling coil disposed on the exterior surface 76 of the inner case portion 62 and the inner lid portion 64, or disposed on an interior surface 74 of the outer case portion 20 and the outer lid portion 22, or disposed in the void 71 between the inner case portion 62 and the outer case portion 20, and/or in the void 71 between the inner lid portion 64, and outer lid portion 22. The thermoelectric cooler/warmer 82 selectively thermoregulates a temperature of the battery 12 within the thermal enclosure 14. In some aspects, selectively thermoregulating the temperature of the battery 12 includes pre-heating the battery 12 when an ambient temperature is below a predetermined threshold value so that the battery 12 can provide appropriate amperage to run motor vehicle 10 peripherals and/or a starter motor (not shown). In other examples, selectively thermoregulating the temperature of the battery 12 includes cooling the battery 12 to protect the longevity and performance of the battery 12 while preventing unwanted decomposition of electrolyte solvents within the battery 12.

Figure 8:
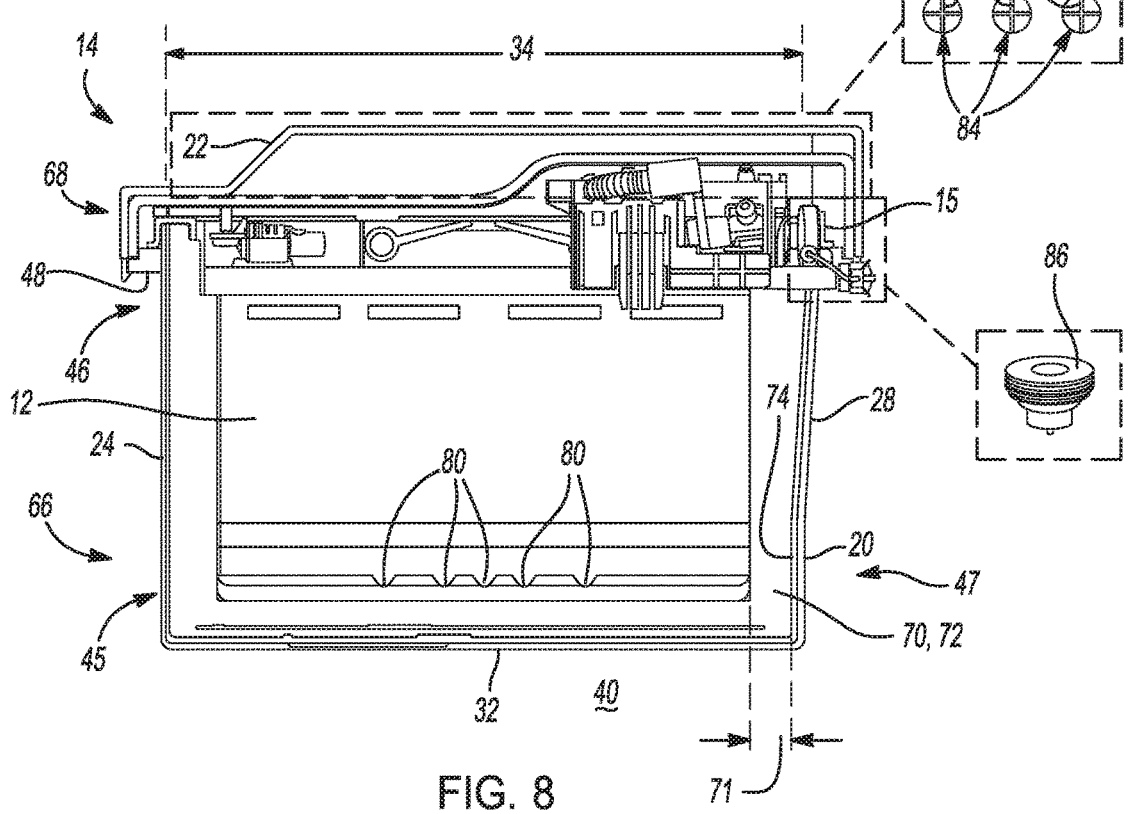
FIG. 8 is a cross sectional view of a thermal enclosure having a plurality of configurable vents and vent plugs according to an aspect of the present disclosure.

Turning now to FIG. 8, and with continuing reference to FIGS. 1-7, in some examples, the thermal enclosure 14 includes a configurable vent 84. The configurable vent 84 is an opening in the thermal enclosure 14 providing airflow into and/or out of the thermal enclosure 14. That is, in several aspects, the configurable vent 84 operates as the air inlet 36 and/or air outlet 38 of the thermal enclosure 14. Airflow through the configurable vent 84 can be selectively obstructed by a vent plug 86. The vent plug 86 is an air-tight seal that engages with the configurable vent 84 to prevent airflow through the configurable vent 84. In several aspects, the thermal enclosure 14 may include a plurality of configurable vents 84 and a plurality of vent plugs 86. By including a plurality of configurable vents and vent plugs 84, 86, a single thermal enclosure 14 design may be used with a variety of different motor vehicles 10 having different battery 12 storage locations within the motor vehicle 10. Thus, in a given motor vehicle 10, certain of the configurable vents 84 that are not optimally positioned to thermoregulate the thermal enclosure 14, are obstructed by the vent plugs 86, whereas others of the plurality of configurable vents 84 which are more optimally positioned are left unobstructed. Thus, the plurality of configurable vents 84 selectively provide airflow to the thermal enclosure 14 in a given application.

Figure 9:
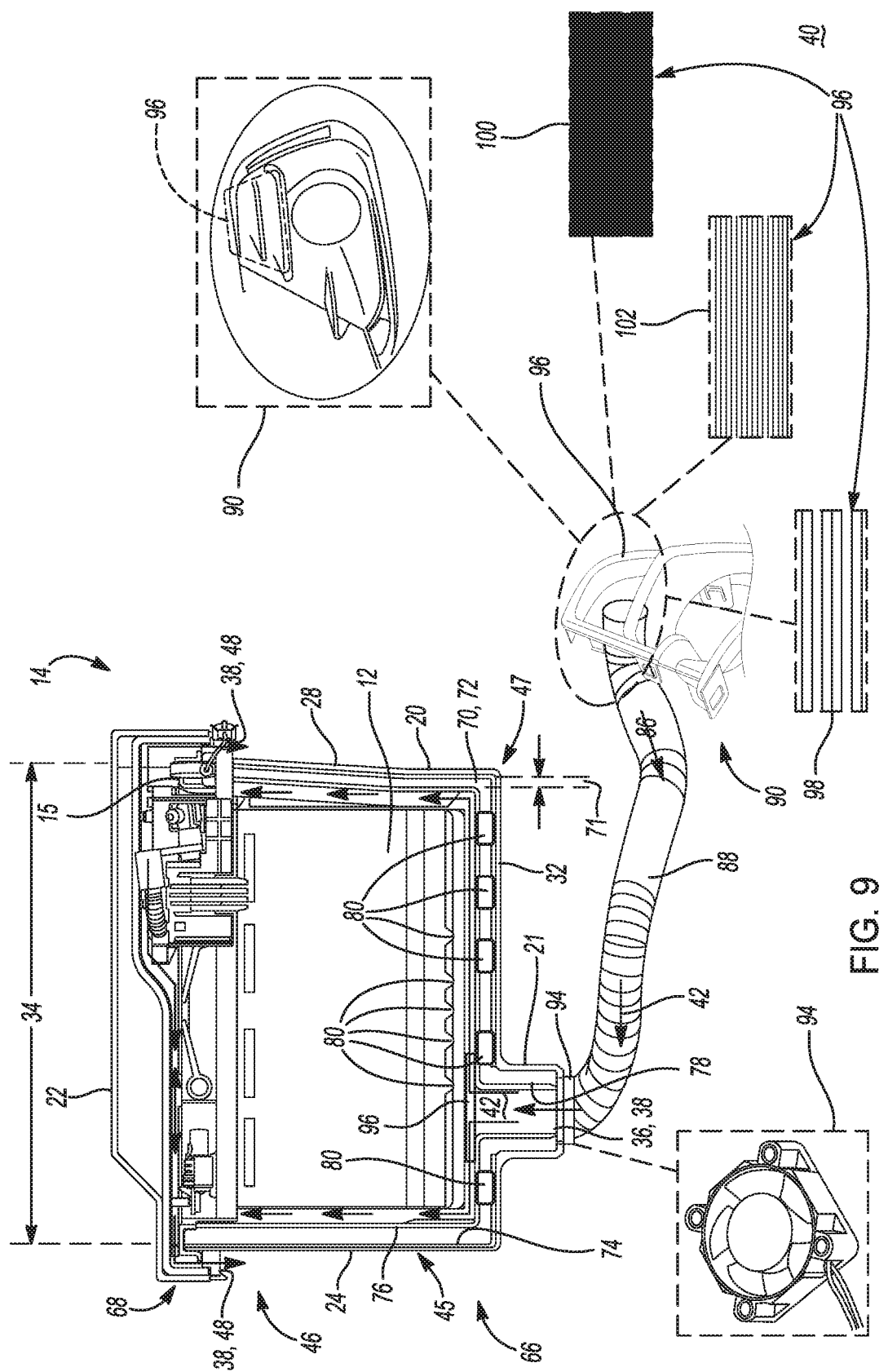
FIG. 9 is a cross sectional view of a thermal enclosure having a fan, a baffle, and an intake hose according to an aspect of the present disclosure.

Turning now to FIG. 9, and with continuing reference to FIGS. 1-8, in some examples, the thermal enclosure 14 has an inlet hose 88. The inlet hose 88 directs cooling air 42 from an air intake 90 disposed on an exterior surface 92 of the motor vehicle 10 into the thermal enclosure 14 via the air inlet 36. In several aspects, the air intake 90 is disposed on a front trim panel such as a headlight or fog light surround, or in a grill opening, a wheel-well, or any other such exterior surface 92 of the motor vehicle 10. In other aspects, the air intake 90 is disposed in an area on the underside of the motor vehicle 10 and draws cooling air 42 from beneath the motor vehicle 10. The inlet hose 88 may be formed of any of a variety of different materials, and take any of a variety of different shapes, sizes, and the like without departing from the scope or intent of the present disclosure. In some aspects, the inlet hose 88 is formed of plastic, metal, rubber, or a composite material depending on the thermoregulation requirements of the battery 12 and the particular motor vehicle 10 application.

In one example, the inlet hose 88 is used with a fan 94. The fan 94 may be disposed at the air inlet 36, at the air intake 90, or elsewhere in the thermal enclosure 14 or inlet hose 88, or any combination thereof. In some aspects, more than one fan 94 may be used with a single thermal enclosure 14. The fan 94 is an electrically-powered air movement device that selectively draws cooling air 42 through the inlet hose 88 to thermoregulate the battery 12. In some aspects, the fan 94 generates a flow of cooling air 42 into the thermal enclosure 14, while in other aspects, the fan 94 generates a flow of air out of the thermal enclosure 14 to draw heat away from the battery 12. In still other aspects, the fan 94 is a reversible air movement device that draws air into the thermal enclosure 14 under some conditions, while drawing air out of the thermal enclosure 14 in other conditions.

In another example, the inlet hose 88 is used with a baffle 96. The baffle 96 may be disposed at the air inlet 36, at the air intake 90, within the inlet hose 88, within the thermal enclosure 14, or any combination thereof. The baffle 96 selectively allows cooling air 42 through the inlet hose 88 into the thermal enclosure 14. In several aspects, the baffle 96 is mechanically, chemically, or thermally actuated. That is, in some examples, the baffle 96 is made of a thermally sensitive material with variable density. An exemplary thermally sensitive material has a low density 98 at relatively high temperatures while having a high density 100 at relatively low temperatures, with a range of intermediate densities 102 disposed therebetween. In some examples, the baffle 96 has a plurality of perforations (not specifically shown) operable to selectively provide airflow into and/or out of the thermal enclosure 14. Thus, in order to maintain the battery 12 at optimal operating temperatures in relatively cold (e.g. below 0° C.) ambient temperatures, the thermally sensitive material of the baffle 96 has a high density, thereby preventing the ingress and/or egress of cooling air 42 to/from the thermal enclosure 14 and thus allowing the battery 12 to warm up. By contrast, in high ambient temperatures (e.g. above about 35° C.), the thermally sensitive material of the baffle 96 has a low density, thereby allowing the ingress and/or egress of cooling air 42 into and/or out of the thermal enclosure 14, thereby allowing the battery 12 to be cooled. In another example, the baffle 96 may include a heating pad or cooling coil of the like described hereinabove. A baffle 96 being made of a heating pad or cooling coil assists in the heating and/or cooling of the battery 12 beyond the mere flow of cooling air 42 through the thermal enclosure 14.

A thermal enclosure or thermal box 14 of the present disclosure offers several advantages. These include providing a high degree of thermal isolation for the battery 12 and self-cooling/warming to optimize to optimize a service condition of the battery 12. Moreover, the thermal enclosure 14 of the present disclosure promotes battery safety, longevity, performance, and decreases storage capacity loss due to thermal damage, while also decreasing the overall costs to both the motor vehicle 10 owner and manufacturer.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A battery enclosure shaped and sized to accept and surround a battery within a motor vehicle, the battery enclosure comprising:
   an outer case portion defining an aperture and having a base portion forming a bottom of the battery enclosure, the outer case portion defined by a first wall portion connected to a second wall portion, the second wall portion connected to a third wall portion, and a fourth wall portion connected to the first wall portion and the third wall portion, each of the first wall portion, second wall portion, third wall portion, and fourth wall portion extending substantially orthogonally from the base portion; and
   a separable outer lid portion shaped to fit around the aperture of the outer case portion;
   an inner case portion sized and shaped to fit substantially concentrically within and spaced apart from the outer case portion; and
   an inner lid portion sized and shaped to fit substantially concentrically within and spaced apart from the outer lid portion,
   wherein the outer case portion and the outer lid portion comprise a material that thermally isolates the battery relative to ambient surroundings of the battery enclosure, and wherein the battery enclosure has an air inlet formed through the base portion and selectively providing airflow to the battery enclosure and an air outlet selectively providing airflow from the battery enclosure, the outer case portion has a first thickness, the outer lid portion has a second thickness, and wherein the air inlet and the air outlet are coaxial and concentric, and formed through the inner case portion and the outer case portion.

2. The battery enclosure of claim 1 wherein the air outlet comprises an opening between the outer lid portion and the outer case portion.

3. The battery enclosure of claim 1 wherein the air inlet has a diameter of between about 0.1 mm and about 20 cm, and the air inlet is disposed in a lower portion of the battery enclosure, and the air outlet is disposed in an upper portion of the battery enclosure.

4. The battery enclosure of claim 1 further comprising a configurable vent, wherein the configurable vent selectively provides airflow to the battery enclosure.

5. The battery enclosure of claim 1 wherein the first thickness is variable, and the second thickness is variable.

6. The battery enclosure of claim 1 wherein the battery enclosure has a multi-layer architecture wherein:
   a volume of air is disposed between the inner case portion and the outer case portion, and between the inner lid portion and the outer lid portion, and each of the inner case portion and the inner lid portion is made of the material that thermally isolates the battery relative to ambient surroundings of the battery enclosure.

7. The battery enclosure of claim 1 wherein the inner lid portion, the outer lid portion, the inner case portion, and the outer case portion are made of a material comprising one or more of: a resin, a plastic, a polypropylene, and a polyethylene terephthalate (PET).

8. The battery enclosure of claim 1 further comprising a thermoelectric pad or a cooling coil, the thermoelectric pad or cooling coil disposed on a surface of the inner case portion and the inner lid portion, or disposed on an interior aspect of the outer case portion and the outer lid portion, or disposed between the inner case portion and the inner lid portion, and the outer case portion and the outer lid portion, the thermoelectric pad or cooling coil selectively thermo-regulating a temperature of the battery within the battery enclosure.

9. The battery enclosure of claim 1 wherein a layer of aerogel material having a thickness of about 0.01 mm and about 3 cm is disposed on an internal or external aspect of the inner case portion and the inner lid portion, or on an internal aspect of the outer case portion and the outer lid portion.

10. The battery enclosure of claim 9, wherein the aerogel material comprises one or more of: silica, carbon, metal oxides, and organic polymers.

11. The battery enclosure of claim 1 further comprising a plurality of spacer pads disposed between the inner case portion and the outer case portion, wherein the spacer pads generate a directed airflow pattern between the inner case portion and the outer case portion.

12. The battery enclosure of claim 11 wherein each of the plurality of spacer pads has a thickness of between about 0.01 mm and about 2 cm, and wherein each of the spacer pads comprises: a metal, a plastic, or a resin.

13. The battery enclosure of claim 11 wherein the spacer pads are integrally formed with the outer case portion or the inner case portion.

14. The battery enclosure of claim 1 further comprising an inlet hose, wherein the inlet hose directs air from an air intake disposed on an exterior surface of the motor vehicle into the battery enclosure via the air inlet.

15. The battery enclosure of claim 14 wherein a fan or a baffle selectively directs air through the inlet hose into the battery enclosure, wherein the baffle is mechanically, chemically, or thermally actuated.

16. The battery enclosure of claim 15 wherein the fan is selectively reversible to direct air from the battery enclosure through the inlet hose.

17. The battery enclosure of claim 15 wherein the baffle comprises a thermally sensitive material, a heating pad, or a cooling coil, the baffle disposed over the air inlet and having a plurality of perforations, the baffle selectively heating or cooling air entering the battery enclosure.

18. A multi-layer battery enclosure for a battery of a motor vehicle, the battery enclosure comprising:
an outer case portion defining an aperture and having a base portion forming a bottom of the battery enclosure, the outer case portion defined by a first wall portion connected to a second wall portion, a second wall portion connected to a third wall portion, and a fourth wall portion connected to the first wall portion and the third wall portion, each of the first wall portion, second wall portion, third wall portion, and fourth wall portion extending substantially orthogonally from the base portion;
an inner case portion sized and shaped to fit substantially concentrically within and spaced apart from the outer case portion;
an air inlet forming an opening through the base portion of the outer case portion and the inner case portion;
a separable outer lid portion shaped to fit around the aperture of the outer case portion;
an inner lid portion sized and shaped to fit substantially concentrically within the outer lid portion, the inner lid portion being shaped to provide for a volume of air to be disposed between the inner lid portion and the outer lid portion; and
a plurality of spacer pads integrally formed in at least one of the outer case portion and the inner case portion, the plurality of spacer pads spacing apart the inner case portion and the outer case portion, and generating a directed tunable airflow pattern between the inner case portion and the outer case portion, the spacer pads providing for a volume of air to be disposed between the inner case portion and the outer case portion,
wherein each of the outer case portion, the outer lid portion, the inner case portion, and the inner lid portion comprise a material that thermally isolates the battery relative to ambient surroundings of the battery enclosure, and each of the outer case portion, the outer lid portion, the inner case portion, and the inner lid portion have a thickness between about 0.1 mm to about 5 cm, the air inlet having a diameter of between about 0.1 mm and about 20 cm and disposed in a lower portion of the battery enclosure, and an air outlet forming an opening between the outer lid portion and the outer case portion, the battery enclosure shaped and sized to accept and surround both the battery and a pre fuse disposed on the battery, an inlet hose is connected to the air inlet, the inlet hose directing air from an air intake disposed on an exterior of the motor vehicle into the battery enclosure, and wherein a fan or a mechanically, chemically, or thermally activated baffle selectively allows air from the inlet hose into the battery enclosure, and wherein the air inlet and the air outlet are coaxial and concentric, and formed through the inner case portion and the outer case portion.

19. A multi-layer battery enclosure for a battery of a motor vehicle, the battery enclosure comprising:
an outer case portion defining an aperture and having a base portion forming a bottom of the battery enclosure, the outer case portion defined by a first wall portion connected to a second wall portion, a second wall portion connected to a third wall portion, and a fourth wall portion connected to the first wall portion and the third wall portion, each of the first wall portion, second wall portion, third wall portion, and fourth wall portion extending substantially orthogonally from the base portion;
an inner case portion sized and shaped to fit substantially concentrically within and spaced apart from the outer case portion;
an air inlet forming an opening through the base portion of the outer case portion and the inner case portion;
a separable outer lid portion shaped to fit around the aperture of the outer case portion;
an inner lid portion sized and shaped to fit substantially concentrically within the outer lid portion, the inner lid portion being shaped to provide for a volume of air to be disposed between the inner lid portion and the outer lid portion;
a plurality of spacer pads integrally formed in at least one of the outer case portion and the inner case portion, the plurality of spacer pads spacing apart the inner case portion and the outer case portion, and generating a directed airflow pattern between the inner case portion and the outer case portion, the spacer pads providing for a volume of air to be disposed between the inner case portion and the outer case portion;
a thermoelectric pad or a cooling coil, the thermoelectric pad or cooling coil disposed on a surface of the inner case portion and the inner lid portion, or disposed on an interior aspect of the outer case portion and the outer lid portion, or disposed between the inner case portion and the inner lid portion, and the outer case portion and the outer lid portion, the thermoelectric pad or cooling coil selectively thermoregulating a temperature of the battery within the battery enclosure; and a configurable vent, wherein the configurable vent selectively provides airflow to the battery enclosure, wherein each of the outer case portion, the outer lid portion, the inner case portion, and the inner lid portion comprise a material that thermally isolates the battery relative to ambient surroundings of the battery enclosure, and each of the outer case portion, the outer lid portion, the inner case portion, and the inner lid portion have a thickness between about 0.1 mm to about 5 cm, the air inlet having a diameter of between about 0.1 mm and about 20 cm and disposed in a lower portion of the battery enclosure, and an air outlet forming an opening between the outer lid portion and the outer case portion, the battery enclosure shaped and sized to accept and surround both the battery and a pre fuse disposed on the battery, an inlet hose is connected to the air inlet, the inlet hose directing air from an air intake disposed on an exterior of the motor vehicle into the battery enclosure, and wherein a fan or a mechanically, chemically, or thermally activated baffle selectively allows air from the inlet hose into the battery enclosure, and wherein the air inlet and the air outlet are coaxial and concentric, and formed through the inner case portion and the outer case portion.

\* \* \* \* \*